United States Patent
Yao et al.

(10) Patent No.: US 11,549,038 B2
(45) Date of Patent: Jan. 10, 2023

(54) TWO-COMPONENT POLYURETHANE SEALANT FOR APPLICATION AT LOW TEMPERATURE

(71) Applicant: SIKA TECHNOLOGY AG, Baar (CH)

(72) Inventors: Hong Yao, Boonton, NJ (US); Michael Schlumpf, Stallikon (CH)

(73) Assignee: SIKA TECHNOLOGY AG, Baar (CH)

( * ) Notice: Subject to any disclaimer, the term of this patent is extended or adjusted under 35 U.S.C. 154(b) by 878 days.

(21) Appl. No.: 16/346,446

(22) PCT Filed: Dec. 6, 2017

(86) PCT No.: PCT/EP2017/081623
§ 371 (c)(1),
(2) Date: Apr. 30, 2019

(87) PCT Pub. No.: WO2018/108655
PCT Pub. Date: Jun. 21, 2018

(65) Prior Publication Data
US 2020/0181468 A1    Jun. 11, 2020

(30) Foreign Application Priority Data
Dec. 15, 2016 (EP) .................... 16204451

(51) Int. Cl.
*C09J 175/08* (2006.01)
*C08G 18/12* (2006.01)
*C08G 18/18* (2006.01)
*C08G 18/48* (2006.01)
*C08G 18/76* (2006.01)
*C09J 5/00* (2006.01)

(52) U.S. Cl.
CPC ............ *C09J 175/08* (2013.01); *C08G 18/12* (2013.01); *C08G 18/1833* (2013.01); *C08G 18/4808* (2013.01); *C08G 18/4825* (2013.01); *C08G 18/4841* (2013.01); *C08G 18/7614* (2013.01); *C08G 18/7671* (2013.01); *C09J 5/00* (2013.01); *C09J 2475/00* (2013.01)

(58) Field of Classification Search
CPC ........ C09J 175/08; C09J 5/00; C09J 2475/00; C08G 18/12; C08G 18/1833; C08G 18/4808; C08G 18/4825; C08G 18/4841; C08G 18/7614; C08G 18/7671; C08G 18/3256; C08G 18/302; C08G 18/4812; C08G 18/4845; C08G 18/7621; C08L 83/08
See application file for complete search history.

(56) References Cited

U.S. PATENT DOCUMENTS

| | | | | |
|---|---|---|---|---|
| 5,077,360 A | * | 12/1991 | DePompei | ........... C08G 18/728 528/61 |
| 2009/0017311 A1 | * | 1/2009 | Kislig | ............... C08G 18/4866 428/423.1 |
| 2010/0255314 A1 | * | 10/2010 | Burckhardt | ........... C07C 251/08 156/331.7 |
| 2010/0285311 A1 | * | 11/2010 | Steidl | ................ C08G 18/2845 524/436 |
| 2015/0259465 A1 | | 9/2015 | Burckhardt et al. | |
| 2015/0353769 A1 | | 12/2015 | Byrne et al. | |
| 2016/0053147 A1 | | 2/2016 | Kelch et al. | |

FOREIGN PATENT DOCUMENTS

| CN | 102559033 A | 7/2012 |
|---|---|---|
| CN | 104640894 A | 5/2015 |
| CN | 104903378 A | 9/2015 |
| CN | 105121492 A | 12/2015 |

OTHER PUBLICATIONS

Mar. 19, 2018 International Search Report issued in International Patent Application PCT/EP2017/081623.
Mar. 19, 2018 Wirtten Opinion issued in International Patent Application PCT/EP2017/081623.
Jul. 24, Office Action issued in European Patent Application No. 17825130.2.

* cited by examiner

*Primary Examiner* — Cynthia L Schaller
(74) *Attorney, Agent, or Firm* — Oliff PLC

(57) ABSTRACT

A two-component composition is described which comprises A) an isocyanate component comprising an isocyanate-terminated urethane prepolymer, B) a water component comprising water, and at least one latent amine hardener in component A).
The two-component composition of the invention is suitable as a sealant, in particular as a joint sealant. Particular advantages are that primerless application is possible with good adhesion, even at low temperatures, such as 4.4° C. or below. The substrate to be sealed are preferably concrete substrates.

16 Claims, No Drawings

TWO-COMPONENT POLYURETHANE SEALANT FOR APPLICATION AT LOW TEMPERATURE

TECHNICAL FIELD

The present invention relates to a two-component composition and its use as a sealant, in particular for sealant applications at low temperatures.

BACKGROUND OF THE INVENTION

Two-component urethane compositions are widely used for sealant applications, particularly joint sealing in the construction market.

One-component polyurethane sealant is generally based on curing mechanism of the reaction between free isocyanate, which is in the sealant, with moisture in the ambient condition. At very low temperature moisture level in the ambient condition is very low, thus the curing through becomes very slow. In addition, the sealant at very low temperature becomes too heavy to be applied. Furthermore, at low temperature the adhesion buildup also dramatically slows down, in most cases it takes weeks if not months to develop adhesion, and to develop primerless adhesion can become extremely demanding.

A typical two-component polyurethane sealant according to the prior art is generally designed by a major portion of curing through the reaction between hydroxyl groups and sometime additional amino functionalities in one component with isocyanate groups in the second component, another portion of curing is through the reaction between moisture in the surrounding also with isocyanate groups in the second component. A multicomponent polyurethane sealant usually has a third component or additional components made of pigment, catalyst and some other accessory chemical ingredients.

The drawback of these products is that these products have set the low end of application temperature at 4.4° C. (40° F.). However, especially in North America, the time when temperature drops below 4.4° C., is very long. In Canada and some area of the United States of America the winter season with temperatures below 4.4° C. can be longer than 6 months. Actually, during the winter season the construction jobs in generally slow down, one reason being the availability of good joint sealant with their limitation highlighted above.

At very low temperatures, first it becomes difficult to mix all the components together, secondly due to the design reason, the curing path through moisture will be slow, and the adhesion development also becomes extremely slow because the widely used silane coupling agents as adhesion promoter also need water to be activated. The water curing portion is needed mainly for supporting primerless adhesion development because free isocyanate itself is an adhesion promoter for many substrates, for example concrete.

Even if the reaction of hydroxyl groups with isocyanate groups can be accelerated by selecting an effective catalyst, the curing through water remains slow simply because there is not much water available under the ambient condition if the temperature is very low. Accordingly, the compositions of the prior art exhibit very low adhesion to concrete surfaces and thus it is necessary to prime said surfaces before the sealant composition can be applied.

As a result, there is no polyurethane sealant which is currently recommended for applications below 40° F.

US 2015/0353789 describes a one-part moisture-curing liquid applied waterproofing-membrane including a polyurethane polymer and blocked amine hardeners. This composition normally requires 8-20 hours to cure, and application below 5° C. is not recommended.

US 2015/0259465 describes a two-component polyurethane composition containing a polyol, a polyisocyanate, a blocked amine and a bismuth(III)- or zirconium (IV)-catalyst. The recommended mixing and application temperature is between 15 and 40° C.

US 2016/0053147 describes a two-component polyurethane composition consisting of a polyol component and a polyisocyanate component, wherein the polyol component comprises different polyols and an aliphatic polyamine in specific ratios. This polyurethane composition, when cured, is able to de-bond from the substrate when heated above 120° C. The composition is not described as particularly suitable for low temperature application.

SUMMARY OF THE INVENTION

It was an object of the present invention to overcome these disadvantages of the prior art. In particular, it was an object of the present invention to provide a two-component composition, particularly for use as a sealant, especially a joint sealant, which can be applied at very wide application temperatures, especially at low temperatures, to adhere to a substrate, particularly a concrete substrate, without the need of a primer on the substrate. Moreover the two-component urethane composition shall be easily mixable, non-sag and fast curing at low temperatures.

Surprisingly it was found that the above mentioned problems could be solved by a two-component composition, comprising
A) an isocyanate component comprising an isocyanate-terminated urethane prepolymer,
B) a water component comprising water, and
at least one latent amine hardener in component A).

The two-component composition according to the present invention shows surprisingly a superior workability, easy miscibility, non-sag and rapid curing properties, especially at low temperatures. Moreover, the two-component composition according to the invention can be used in primerless sealing applications, especially on concrete surfaces.

The following advantages of the inventive two-component compositions and preferred embodiments thereof can be mentioned.

Easy to mix at very low temperature thanks less high viscous resin can be used in the formulation, which is the result of introducing water/latent hardener/isocyanate for more urea units to be built into the system for improved mechanical properties, among other, the performance of joint movement, which is an important issue for joint sealing products, in particular for products marketed in North America.

The reduced total high viscous resin level in the system is also important for the possibility to formulate products which can exhibit non-sagging property at very low temperature Cure through fast at very low temperature due to the predominant cure mechanism through reaction between isocyanate and amine, which is released from the reaction between latent hardener and water. Water, isocyanate and latent hardener are in the system but water and isocyanate are located in separate 2 components while latent hardener can be located in water or with isocyanate containing component.

A sufficient high neat isocyanate level, preferably increased by a neat addition of monomeric isocyanate, combining with a silane coupling agent, and the availability of water and a selective catalyst improves fast development of primerless adhesion at very low temperature.

Because of the cure through the latent hardener, more possibilities become available to form more urea units in the final products, which then exhibit higher mechanical strength with a relatively lower resin level as compared to system which cure through reaction of isocyanate with polyols and water to achieve the same levels of strength and softness at the same time, all critical for a product for joint sealing application. In addition, a lower level of the high viscous resin level is favorable for a 2 component system, which can be mixed at lower temperature and remain thixotropic.

The invention further relates to the use of the two-component composition as a sealant, particularly for applications at low temperature and to a method for sealing substrates, especially concrete substrates with the two-component composition. Furthermore, the invention relates to a sealant composition comprising the two-component composition.

DETAILED DESCRIPTION OF THE INVENTION

The term "low temperature" as used herein shall be understood as a temperature of 4.4° C. (40° F.) or below.

Substance names beginning with "poly" such as e.g. polyol, polyisocyanate or polyurethane, designate substances which formally contain, per molecule, two or more of the functional groups occurring in their names. A polyol is e.g. a substance having two or more hydroxyl groups.

An isocyanate terminated polymer is a polymer or prepolymer having at least one terminal isocyanate group, in particular two terminal isocyanate groups.

The term prepolymer here generally refers to oligomers or polymers which are used as intermediate products for producing polymers with higher molecular weight.

The term "water component" as used herein refers to an individual component of the two-component composition that comprises water in a liquid state. The term "water component" does further not apply to any water from moisture of the surrounding atmosphere.

A latent amine hardener as used in the present invention represents a family of substances that upon contact with water can hydrolyze to form the corresponding amines. Based on this characteristic, they can be used as a protected form of amines. They are widely used in polyurethane chemistry, where they are used as cross-linking agents that can be activated by water, so-called "latent amine hardeners", "blocked amines" or "latent curing agents," for single- or two-component compositions that have isocyanate groups.

The term "average molecular weight" refers to the number-average molecular weight (Mn) of an oligomeric or polymeric mixture of molecules or moieties, unless otherwise stated.

Incidentally, while in the present invention isocyanate component is often designated as isocyanate component A, in commercial two component product setups, the isocyanate containing component is often referred to as "hardener" or "part B" and the other component as "base" or "part A".

Isocyanate-Terminated Urethane Prepolymer

The two-component composition according to the present invention comprises an isocyanate component A. The isocyanate component A) comprises an isocyanate-terminated urethane prepolymer. As is known by the skilled person, the isocyanate-terminated urethane prepolymer is typically obtained by reacting at least one polyisocyanate, preferably a diisocyanate, and at least one polyol.

The at least one polyol may be one or more polyols. There is a huge variety in the potential polyols. The polyol may have two or more hydroxyl groups, e.g. a diol or a triol or a mixture thereof. The at least one polyol is however preferably two or more polyols, preferably at least one diol and at least one triol.

Examples of suitable polyols are polyoxyalkylenepolyols, also referred to as polyetherpolyols, polyesterpolyols, polycarbonatepolyols, poly(meth)acrylate polyols, polyhydrocarbon-polyols, polyhydroxy-functional acrylonitrile/butadiene copolymers and mixtures thereof, wherein the at least one polyol is preferably at least one polyetherpolyol.

According to the present invention, it is preferred that the isocyanate-terminated urethane prepolymer is obtainable by reacting at least one polyisocyanate, preferably a diisocyanate, with at least two polyetherpolyols. More preferably, the isocyanate-terminated urethane prepolymer is obtainable by reacting at least one polyisocyanate, preferably a diisocyanate, with at least one polyether diol and at least one polyether triol. The polyetherpolyol or the polyether diol and polyether triol, respectively, which are used are preferably liquid at room temperature (23° C.).

Polyether polyols also called polyoxyalkylene polyols, or oligoetherols, are polymerization productions of ethylene oxide, 1,2-propylene oxide, 1,2- or 2,3-butylene oxide, oxetane, tetrahydrofuran or mixtures thereof, optionally polymerized using a starter molecule with two or more active hydrogen atoms, such as, for example, water, ammonia, or compounds with several OH or NH groups, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octariediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds.

Suitable examples of polyetherpolyols are polyoxyethylenepolyols, polyoxypropylene-polyols and polyoxybutylenepolyols, in particular polyoxyethylenediols, polyoxypropylenediols, polyoxybutylenediols, polyoxyethylenetriols and polyoxypropylenetriols. Further examples of polyetherpolyols are so-called ethylene oxide-terminated ("EO-end-capped", ethylene oxide-end-capped) polyoxypropylenepolyols, or styrene-acrylonitrile-grafted polyetherpolyols.

Preferred examples of a polyether diol are a polyoxyethylenediol, a polyoxypropylenediol, and a polyoxybutylenediol. Preferred examples of a polyether triol are a polyoxyethylenetriol and a polyoxypropylenetriol or a EO-endcapped polyoxypropylenetriol. Examples of suitable commercial polyols are Acclaim®4200 (from Covestro) as a polyether diol, and Arcol®E-448 (from Covestro) as a polyether triol.

The polyols, in particular the polyether diols and polyether triols, may have, e.g. an average molecular weight in the range of 500 to 8000 g/mol, preferably 2000 to 7000 g/mol.

The polyols, in particular the polyether dials and polyether triols, may have e.g. an hydroxyl value of 2 to 4, preferably of 2 to 3.

There is a huge variety in the potential polyisocyanates, which may be e.g. diisocyanates, triisocyanates or higher polyisocyanates. The at least one polyisocyanate is preferably one or more diisocyanates. Suitable diisocyanates are those which are amply known in polyurethane chemistry, or combinations thereof. As is known by the skilled person, diisocyanates may be in form of pure isomers, mixtures of isomers, and polymeric products thereof such as dimers or trimers, or mixtures thereof. This is also true for other polyisocyanates.

As polyisocyanates for the production of the isocyanate terminated urethane prepolymer, aromatic or aliphatic polyisocyanates, especially aromatic or aliphatic diisocyanates, can be used, wherein aromatic diisocyanates are preferred.

As aromatic polyisocyanates, the following can be used: for example, monomeric di- or triisocyanates, such as 2,4- and 2,6-toluene diisocyanate and any mixtures of these isomers (TDI), 4,4'-2,4'- and 2,2'-diphenylmethane-diisocyanate and any mixtures of these isomers (MDI), mixtures that include MDI and MDI homologs (MDI or PMDI polymers), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODD, dianisidine-diisocyanate (DADI), 1,3,5-tris-(isocyanatomethyl)-benzene, tris-(4-isocyanatophenyl)-methane and tris-(4-isocyanatophenyl)-thiophosphate, oligomers and polymers of the above-mentioned isocyanates, as well as any mixtures of the above-mentioned isocyanates. MDI and TDI are preferably used, wherein toluene dlisocyanates are more preferred. Toluene diisocyanates are also designated toluoylene diisocyanate. An example of a suitable commercial toluene diisocyanate is Mondur®TD-80 (from Convestro), which represents a mixture of 2,4 and 2,6 toluene diisocyanate (TDI) isomers.

As aliphatic polyisocyanates, the following can be used: for example, monomeric di- or triisocyanates, such as 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane, and any mixtures of these isomers (HTD1 or H6TDI), 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI or H12MDI), 1,4-diisocyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3- and -1,4-xylylenediisocyanate (m- and p-TMXDI), bis-(1-isocyanato-1-methylethyl)-naphthalene, dimer- and trimer fatty acid isocyanates such as 3,6-bis-(9-isocyanatononyl)-4,5-di-(1-heptenyl)-cyclohexene (dimeryl diisocyanate), $\alpha,\alpha,\alpha',\alpha',\alpha'',\alpha''$-hexamethyl-1,3,5-mesitylene triisocyanate, oligomers and polymers of the above-mentioned isocyanates, as well as any mixtures of the above-mentioned isocyanates.

The reaction to obtain the isocyanate-terminated urethane prepolymer may be carried out in accordance with common polyurethane synthesis well-known to the skilled person. In a preferred embodiment, the polyols used are liquid at room temperature (23° C.), as mentioned above.

Before addition of an optional catalyst, mixing of the components is preferably carried out under stirring and heating. Stirring under elevated temperature for a certain time is usually suitable in order to obtain a homogenous mixture and optionally to reduce residual water contained in the starting materials. Depending on the starting materials added, it may be suitable to continue stirring under elevated temperature for a certain time before adding the next starting material.

The mixing and stirring of the starting materials is preferably carried out under an elevated temperature which depends on the starting materials used. A suitable temperature during mixing and before addition of an optionally present catalyst is e.g. in the range of 60 to 100° C., preferably 70 to 90° C. The temperature during mixing may be gradually raised.

If a catalyst is used, it is usually added as the last component. One or more catalysts may be used. A huge range of catalysts suitable for polyurethane synthesis may be used. The skilled person is familiar with these catalysts. Examples of suitable catalysts are organotin compounds, tertiary amines, organobismuth compounds, organozirconium compounds, organoruthenium compounds, organotitanium compounds, organoiron compounds, organo-molybdenum compounds and organozinc compounds.

After addition of the optionally present catalyst, stirring under heating is continued. The polymerization may be carried out e.g. at a temperature in the range of 80 to 120° C., preferably 80 to 100° C. The progress of the reaction can be controlled by determining the NCO content in the mixture. If the desired or theoretical NCO content is reached, the reaction is complete and the mixture can optionally be cooled down to a lower temperature, e.g. in the range of 20 to 80° C. The mixture contains an isocyanate-terminated prepolymer.

In a suitable embodiment, the isocyanate terminated urethane prepolymer has e.g. a free isocyanate content of 1.0 to 3.5%, preferably 1.6 to 2.5%. As is known by the skilled person, the free isocyanate content refers to weight percent of free isocyanate groups based on the weight of the isocyanate-terminated urethane prepolymer and can be determined as usual, e.g. by a titration method.

In a preferred embodiment the isocyanate-terminated urethane prepolymer has a free iscoyanate content of 1.0 to 3.5%, preferably, 1.6 to 2.5%, and is obtainable by one or more polyisocyanates, preferably toluene disocyanate, and two or more polyether polyols more preferably one polyether diol and one polyether triol, wherein the polyols used are preferably liquid at room temperature (23° C.). This embodiment of the isocyanate-terminated urethane prepolymer is preferred for all suitable and preferred embodiments of the two-component composition mentioned, unless otherwise stated.

The two-component composition according to the present invention may comprise 17 to 25% by weight, preferably 19 to 20% by weight, of the isocyanate-terminated urethane prepolymer, based on the total weight of the components A) and B).

Water

The two-component composition comprises a second component, namely a "water component B" which comprises water.

The water concentration in the water component B is suitable designed such that water is present in a molar excess, preferably in a significant molar excess, in relation to the free isocyanate groups of the isocyanate terminated urethane prepolymer in the isocyanate component A. In this regard, the molar ratio of water to free isocyanate groups in the isocyanate-terminated urethane prepolymer is preferably from 2:1 to 10:1, more preferably from 2:1 to 7:1.

The water content in the water component B is preferably from 0.5 to 1.5% by weight, more preferably from 0.8 to 1.3% by weight, based on the weight of water component B. It should be clear that the suitable molar ratio of water and free isocyanate groups as outlined above depends on the design of the two-component composition, in particular with respect to the mixing ratio thereof.

Latent Hardener

Furthermore, the two-component composition is characterized in that the isocyanate component A) comprises a latent amine hardener. The skilled person in the field of polyurethane chemistry is familiar with latent amine hardeners and such latent amine hardeners are commercially available. Examples of a suitable latent amine hardener may be aldimines, ketimines or oxazolidines.

The latent amine hardener is preferably an aldimine compound which includes polyaldimine compounds such as dialdimine compounds and trialdimine compounds. Aldimines are typically a condensation product of primary amines and aldehydes. In a preferred embodiment, the at least one latent amine hardener is a dialdimine compound and/or a trialdimine compound, wherein a dialdimine compound is most preferred.

A dialdimine is typically a condensation compound of one molecule of a diamine with two molecules of aldehyde. The two molecules aldehydes can be the same or of different kind. Analogously a trialdimine is typically a condensation product of one molecule of a triamine and three molecules of aldehyde. The three molecules aldehydes can be the same or of different kind.

Upon contact with water, aldimines can hydrolyze to form the corresponding amines and aldehydes. Optionally, said hydrolysis is catalysed by basic catalysis or (preferably) acidic catalysis. Based on this characteristic, they can be used as a protected form of amines, or of aldehydes. Thus, aldimines can be used in polyurethane chemistry as latent hardeners, also designated "blocked amines" or "latent curing agents".

Examples of suitable trialdimine compounds are compounds of formula (I)

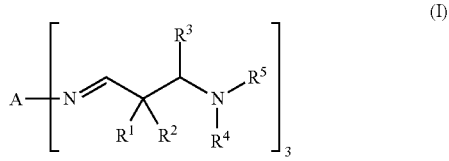

(I)

wherein
A is a trivalent hydrocarbyl moiety of molecular weight or average molecular weight in the range of 380 to 5,000 g/mol containing ether groups,
$R^1$ and $R^2$ are the same or different and represent $C_1$ to $C_{12}$ linear or branched alkyls, or are joined together to form a divalent linear or branched $C_4$ to $C_{12}$ hydrocarbyl moiety which is part of a 5- to 8-membered carbocyclic ring,
$R^3$ is hydrogen or a linear or branched $C_1$ to $C_{12}$ alkyl or arylalkyl or alkoxycarbonyl, and
$R^4$ and $R^5$ are the same or different and represent linear or branched $C_1$ to $C_{20}$ alkyl or cycloalkyl or aralkyl optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group.

In formula (I), $R^1$ and $R^2$ are preferably each methyl. Preferably $R^3$ is hydrogen. Preferably $R^4$ and $R^5$ are each a linear or branched $C_1$ to $C_6$ alkyl or cycloalkyl or aralkyl optionally containing ether groups, or are joined together to form a divalent linear or branched $C_4$ to $C_8$ hydrocarbyl moiety which is part of a 5- to 8-membered heterocyclic ring which, besides the nitrogen atom, may contain an ether or thioether or tertiary amino group.

More preferably $R^4$ and $R^5$ are each a methoxyethyl group or are joined together to form, including the nitrogen atom, a morpholine or a 2,6-dimethylmorpholine ring. Most preferably $R^4$ and $R^5$ form a morpholine ring together with the nitrogen atom. Particularly preferred are trialdimines of the formula (I) wherein $R^1$ and $R^2$ are methyl, $R^3$ is hydrogen and $R^4$ and $R^5$ form a morpholine ring together with the nitrogen atom.

Preferably A is the moiety remaining when removing the primary amino groups of a polyoxypropylene triamine with an average molecular weight in the range of 380 to 5,000 g/mol, commercially available e.g. as Jeffamine® T-403 (from Huntsman), Polyetheramine T 403 (from BASF) or PC Amine® TA 403 (from Nitroil), or as Jeffamine® T-5000 (from Huntsman), Polyetheramine T 5000 (from BASF) or PC Amine® TA 5000 (from Nitroil).

Preferably A is a trivalent hydrocarbyl moiety of average molecular weight in the range of 380 to 2,000 g/mol, particularly 380 to 500 g/mol, containing 1,2-oxypropylene units. Most preferably A is the moiety remaining when removing the primary amino groups of a polyoxypropylene triamine with an average molecular weight in the range of 380 to 500 g/mol, commercially available e.g. as Jeffaminee T-403 (from Huntsman), Polyetheramine T403 (from BASF) or PC Amine® TA 403 (from Nitroil).

A particularly preferred trialdimine of the formula (I) is N,N',N"-tris(2,2-dimethyl-3-(N-morpholino)-propylidene)-polyoxypropylene triamine with an average molecular weight in the range of 860 to 5,500 g/mol, particularly 860 to 960 g/mol.

Examples of suitable dialdimines are a compound of formula (II)

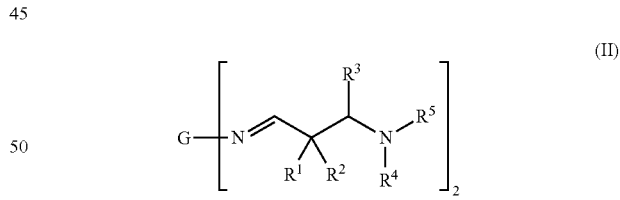

(II)

wherein G is a divalent hydrocarbyl moiety of a molecular weight in the range of 28 to 400 g/mol, preferably 80 to 250 g/mol, and $R^1$, $R^2$, $R^3$, $R^4$ and $R^5$ have the same meanings as defined for compounds of formula (I) including the preferred embodiments unless otherwise stated.

More preferably, G is the moiety remaining when removing the primary amino groups of a diamine, preferably selected from the group consisting of hexamethylene-1,6-diamine, 2-methylpentane-1,5-diamine, 3-aminomethyl-3,5,5-trimethylcyclohexylamine (isophoronediamine), 2,2,4- and 2,4,4-trimethylhexamethylenediamine, 1,3-bis(aminomethyl)benzene, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2, 6)-bis-(aminomethyl)bicyclo[2.2.1]heptane, 3(4),8(9)-bis (aminomethyl)-tricyclo[5.2.1.0$^{2,6}$]decane, 1,2-diaminocyclohexane, 1,3-diaminocyclohexane, 1,4-diaminocyclohexane, 2,2,6-trimethyicyclohexane-1,4-diamine, 3,6-dioxaoctane-1,8-diamine, 4,7-dioxadecane-1,10-diamine and 4-aminomethyl-1,8-octanediamine, 1,3-phenylene diamine, 1,4-phenylene diamine, 2,4- and 2,6-toluylene diamine and 4,4'-, 2,4'- and 2,2'-diaminodiphenylmethane.

Preferred dialdimines of the formula (II) are selected from the group consisting of N,N'-bis(2,2-dimethyl-3-(N-morpholino)-propylidene)-hexamethylene-1,6-diamine and N,N'-bis(2,2-dimethyl-3-(N-morpholino)-propylidene)-3-aminomethyl-3,5,5-trimethyicyclohexylamine. These dialdimines provide a particularly high strength. Particularly preferred is N,N'-bis(2,2-dimethyl-3-(N-morpholino)-propylidene)-3-aminomethyl-3,5,5-trimethylcyclohexylamine.

Another preferred dialdimine is a dialdimine of the formula (III),

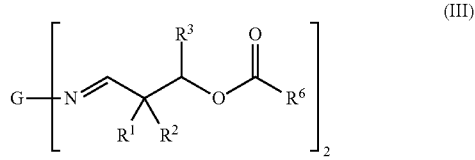

(III)

wherein $R^6$ is a monovalent $C_6$ to $C_{20}$ hydrocarbyl moiety optionally containing ether, carbonyl or ester groups, and G, $R^1$, $R^2$ and $R^3$ have the same meanings as mentioned above for formula (II), including the preferred embodiments, unless otherwise stated.

Preferably $R^6$ is C11 alkyl. Preferred dialdimines of the formula (III) are selected from the group consisting of N,N'-bis(2,2-dimethyl-3-lauroyloxypropylidene)-hexamethylene-1,6-diamine and N(N'-bis(2,2-dimethyl-3-lauroyloxypropylidene)-3-aminomethyl-3,5,5-trimethylcyclohexylamine.

The dialdimines and triaidimines can be prepared by conventional methods known by the skilled person. Thus, the triaidimines of the formula (I) are preferably available from a condensation reaction of at least one primary triamine of the formula (IVa) and at least one aldehyde of the formula (Va). The dialdimines of the formula (II) are preferably available from a condensation reaction of at least one primary diamine of the formula (IVb) and at least one aldehyde of the formula (Va). The dialdimines of the formula (III) are preferably available from a condensation reaction of at least one primary diamine of the formula (IVb) and at least one aldehyde of the formula (Vb).

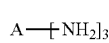

(IVa)

(IVb)

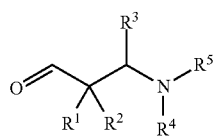

(Va)

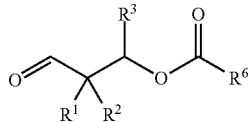

(Vb)

In the formulae (IVa), (IVb), (Va) and (Vb), A, G, $R^1$, $R^2$, $R^3$, $R^4$, $R^5$ and $R^6$ have the meanings already mentioned in formulae (I), (II) and (III), respectively.

For this condensation reaction, the aldehyde of the formula (Va) or of the formula (Vb) is usually used stochiometrically or in excess related to the primary amino groups of the primary triamine of the formula (IVa) or of the primary diamine of the formula (IVb). The reaction can advantageously be conducted at a temperature in the range between 15 and 120° C., either in the presence of a solvent or without a solvent. The released water may be removed either azeotropically with a suitable solvent, or directly under vacuum.

The latent amine hardener of the present invention is preferably present in an amount of 1.0 to 3.0% by weight, more preferably of 1.5 to 2.5% by weight, based on the total weight of the components A) and B).

The latent amine hardener of the present invention is part of the isocyanate component A). The latent amine hardener is thereby preferably present in an amount of 6.5 to 10.0% by weight based on the total weight of the component A).

The amount of the latent amine hardener in the two-component composition is preferably such that, after curing of the two-component composition, the crosslink density through the latent amine hardener, preferably the dialdimines and/or trialdimines, is 25 to 95%, preferably 45 to 75%. This crosslink density refers to the crosslink density of the isocyanate groups of the urethane prepolymer and does not include crosslinking to any isocyanate groups of the optional addition of monomeric isocyanate compounds. In this way, a particular good cure through speed can be achieved and no negative impact on primerless adhesion development is realized. The crosslink density refers to the percentage of crosslinked free isocyanate groups after mixing and curing of the two-component composition according to the present invention relative to the total of free isocyanate groups in the polyurethane prepolymer before curing. The residual free isocyanate groups are substantially also reacted by other mechanism, e.g. by reaction with water.

Further Optional Ingredients for Component A) and/or Component B)

Amine Catalyst

The two-component composition according to the present invention may optionally and preferably comprise at least one amine catalyst in the isocyanate component A) and/or in the water component B). The amine catalyst can promote the reaction of isocyanate with water. Such amine catalysts are known to the skilled person. The amine catalyst is further preferably characterized in that it maintains its activity to catalyze the reaction of isocyanate with water at temperatures down to −10° C. The amine catalyst is preferably a tertiary amine compound.

A typical and preferred amine catalyst is dimorpholino-diethylether (DMDEE).

The amine catalyst, if present, may be present e.g. in an amount of 0.002 to 0.12% by weight, preferably 0.05 to 0.10% by weight based on the total weight of the isocyanate component A) and the water component B).

It is preferred that the reaction of release of free amine-hardener from the reaction of water with the latent hardener preferably always occurs first. This is ensured by high level of the water in the component as discussed above and also using a selective catalyst, namely the amine catalyst.

The invention provides reasonable fast cure and primerless adhesion to concrete at very low temperature. The speed of cure through the latent hardener is controlled predominantly by the ratio of water to free isocyanate. The amine catalyst, if used, does not promote the cure through latent hardener, but instead it promotes the cure through water with isocyanate, which improves the curing characteristics at low temperature. If there is not sufficient reaction speed between water with isocyanate at low temperature, the sealant will be tacky even it is already somehow elastic. At elevated temperature, there is another situation: the latent hardener cure and water cure can take place all very fast thus the blistering may occur due to $CO_2$ generated through moisture curing mechanism. At low temperature, because moisture cure is slow even a lot of water and an amine catalyst is present, there is no bubbling.

Further Optional Ingredients for Water Component B)

Antifreeze Agent

In order to ensure good workability of the two-component composition at low temperatures, the water component B) optionally and preferably comprises at least one antifreeze agent. An antifreeze agent is generally an additive which lowers the freezing point of a water-based liquid. The use of at least one antifreeze agent is particularly preferred in order to enhance the mobility of water molecules for curing reactions with both the latent amine hardener and the water.

It has been determined that apart from introducing latent hardener for curing water availability is important to ensure proper cure through speed at very low temperature. As water availability can be enhanced by the antifreeze agent, its use in water component B) is a particularly preferred embodiment.

Typical examples of antifreeze agents are methanol, glycols such as ethylene glycol, diethylene glycol, propylene glycol, dipropylene glycol, and glycerol. Preferably the at least one antifreeze agent is propylene glycol and/or diethylene glycol. These antifreeze agents have the advantage of being non-toxic, withstanding relatively high temperatures, and being noncorrosive.

The amount of the at least one antifreeze agent in the water component B), if present, is preferably 0.1 to 0.5 parts by weight, preferably 0.15 to 0.25 parts by weight, to 1 part by weight of the water in the water component B.

Surfactant

The two-component composition may further comprise one or more surfactants in the water component B). The main purpose of the surfactant is to ensure that the water is homogenously mixed with the rest of the ingredients in the formulation. Any conventional surfactant such as anionic, cationic, non-ionic or ampholytic surfactants or mixtures thereof may be used. Only as an example for a suitable surfactant an anionic sulfonate group-containing surfactant, e.g. Rhodacal®DS-10 (from Rhodia) may be mentioned.

The at least one surfactant, if used, is preferably present in an amount of 0.02 to 0.08% by weight, preferably 0.04 to 0.06% by weight in the water component B).

Neutral Liquids

The two-component composition may further comprise one or more neutral liquids, such as plasticizers and/or solvents, in the isocyanate component A) and/or water component B) in order to adjust the viscosity and also to manage the softness of the cured product. Neutral liquids as used herein refers to compounds which are liquid at room temperature (23° C.) and are usually not reactive with the other ingredients contained in the two-component composition.

Suitable plasticizers are, for example esters such as abietic, adipic esters, azelaic acid esters, butyric acid esters, acetic acid esters, higher fatty acid esters having from about 8 to about 44 carbon atoms, esters of OH-functional or epoxidized fatty acids, fatty acid esters and fats, glycolic acid esters, phosphoric acid esters, phthalic acid esters of from 1 to 12 carbon atoms-containing linear or branched alcohols, propionic acid ester, sebacic acid ester, sulfonic acid ester, thiobutyric acid, trimellitic acid esters, citric acid esters and esters of nitrocellulose and polyvinyl acetate base, and mixtures of two or more thereof. Preferably, the plasticizer is a phthalate, such as diisododecyl phtalate (DIDP), commercially available e.g. as Jayflex®DIDP (from ExxonMobile).

Typical examples of solvents, which can be used as neutral liquid, are aromatic solvents such as xylene.

The neutral liquids, such as plasticizers and/or solvents, are preferably present in the isocyanate component A) and/or water component B), in an amount of 25 to 45% by weight, preferably 30 to 40% by weight, based on the total weight of the isocyanate component A) and the water component B).

Filler

The water component B) of the two-component composition may optionally comprise one or more fillers, e.g. at least one solid filler and/or at least one light weight filler, which are in particular hollow microspheres. The solid filler may be an inorganic filler or an organic filler. The solid filler may be used in order to manage the rheology properties and the cured strength of the product. The light weight filler may be used in order to adjust the rheological profile and reduce the material costs.

Examples of a solid filler are chalk, lime powder, precipitated silica, fumed silica, zeolites, bentonites, ground minerals, glass beads, glass powder, glass fibers and chopped strands as well as others known in the art, wherein grounded calcium carbonate such as Marble white Q325 (from Specialty Minerals), precipitated calcium carbonate such as Ultra-flex (from Specialty Minerals), powder PVC plaster are preferred solid fillers.

The combined weight of the one or more solid fillers may be e.g. 40 to 60% by weight, preferably 40 to 50% by weight, based on the weight of the water component B).

The at least one light weight filler may be e.g. hollow microsphere with organic compound as the shell such as Expancel 551DE40d41 (from Akzo). The combined weight of the one or more light weight fillers may be e.g. 0.4 to 1% by weight, based on the weight of the water component B), or 20 to 30% by volume based on the volume of the water component B), respectively.

Thixotropic Agent

The two-component composition according to the invention may optionally further comprise one or more thixotropic agents, preferably intermediate urea based thixotropic agents, in the water component B). The benefit of the thixotropic agent is to achieve non-sagging property of the product.

The intermediate urea based thixotropic agents may be obtained by a combination of polyisocyanates and amines, optionally also comprising a plasticizer. For instance, the intermediate urea based thixotropic agent may be based on a diisocyanate, especially a methylene diphenyl diisocyanate such as Mondor M (from Bayer), a plasticizer, especially phthalate, such as Jayflex DIDP (ExxonMobile) and one or more amine compounds, such as an alkylamine such as N-butylamine and a pyrrolidone, such as N-methyl-2-pyrrolidone.

The at least one thixotropic agent may be present in an amount of 25 to 45% by weight, preferably 30 to 35% by weight, based on the weight of the water component B).

As mentioned above, the at least one thixotropic agent, if present, is preferably contained in water component B). Alternatively, the at least one thixotropic agent, if present, may be contained in isocyanate component A) and/or in water component B), but preferably in either isocyanate component A) or in water component B) for the purpose of easy mixing without introducing air into the product mass.

Pigments

The two-component composition may optionally also comprise one or more pigments in the water component B), e.g. for visual effects. Examples for suitable pigments are titanium dioxide, iron oxide black and/or iron oxide yellow.

Further Optional Ingredients for Isocyanate Component A)

Monomeric Isocyanate

The isocyanate component A) may optionally and preferably comprise one or more monomeric polyisocyanates, preferably diisocyanates or tri-isocyanates or the combination of both. The monomeric polyisocyanate may be aliphatic or aromatic polyisocyanate, preferably monomeric aliphatic or aromatic diisocyanate, in particular monomeric aliphatic diisocyanate.

The monomeric polyisocyanates are preferably added because they promote primerless adhesion to the substrate, in particular concrete substrates, and they promote the storage stability of the isocyanate component A).

Examples of suitable monomeric polyisocyanates are those mentioned above as starting material for the isocyanate-terminated polyurethane prepolymer so that reference is made thereto. Most preferably, the isocyanate monomer is isophorone diisocyanate (IPDI), liquid MDI such as Desmodur CD and/or a HDI-trimer such as the Desmodur N3300.

The amount of monomeric polyisocyanate in the isocyanate component A) is e.g. 1.5 to 3.0% by weight, preferably 2.0 to 2.5% by weight, based on the weight of the isocyanate component A.

Silane Coupling Agent

The isocyanate component A) may optionally and preferably comprise one or more silane coupling agents. Silane coupling agents are silane compounds which are well known to the skilled person. Silane coupling agents typically include at least one hydrolyzable group bound to a Si atom, such as e.g. alkoxy, acyloxy, halogen or amine group, and at least one functional group, such as an epoxy, mercapto, amino and/or isocyanato group, which is bound via a linker group, typically a bivalent alkylene group such as a propylene group, to the Si atom. The silane coupling agent may contain one or more Si atoms. The functional group is preferably a group which is reactive with isocyanate group, examples of which are are epoxy, mercapto and amino group.

The coupling agent is typically an epoxysilane, mercaptosilane, aminosilane and/or isocyanatosilane. Specific examples are bis(trimethoxysilylpropyl)amine (commercially available e.g. as Silquest®A-1170 from Momentive), gamma-mercaptopropyltrimethoxysilane (commercially available e.g. as Silquest®A-189 from Momentive), and gamma-glycidoxypropyltrimethoxysilane (commercially available e.g. as Silquest®A-187 from Momentive).

The silane coupling agent promotes adhesion to the substrate to be sealed. For example, the silane coupling agent is able to react with free isocyanate groups in the sealant and with free hydroxyl, oxide, or silanol groups on the substrate to form a bridge between the sealant and the substrate.

The one or more silane coupling agents, if used, are e.g. used in an amount of 0.5 to 0.7% by weight, based on the weight of the isocyanate component A.

In a preferred embodiment, monomeric polyisocyanates as discussed above and silane coupling agents are used in combination in the isocyanate component A.

It has been determined that sufficient free isocyanate in the system is preferably to achieve primerless bonding to concrete. A combination of increased free isocyanate level through a neat addition of monomeric isocyanate together with a selective silane coupling agent can deliver the best performance, for example, fast adhesion development at low temperature and also good degree of sustained adhesion as tested after water immersion.

Metal Catalyst

When a silane coupling agent is present, the two component composition optionally and preferably comprises a metal catalyst, which is added to the isocyanate component A) comprising the silane coupling agent in order to promote the activation of the silane coupling agent. The metal catalyst is preferably a Lewis acid catalyst.

Examples of suitable catalysts are organotitanate, organotin, titanium complex, aluminum complex and zirconium complex compounds, and combinations thereof. Most preferably, the metal catalyst is a titanium complex also designated chelated titanate.

Examples of chelated titanates are dihydroxy bis [2-hydroxypropanato (2-)-O1,O2)(2-)titanate, mixed titanium ortho ester complexes, TYZOR® 101, TYZOR®GBA (acetylacetonate chelate), bis(ethyl-3-oxobutanolato O1,O3) bis(2-propanolato) titanium, TYZOR®CLA, isopropoxy(triethanolaminato) titanium and alkanolamine complex of titanium such as Tyzor® TE which is a triethanolamine titanium complex with 80% active ingredient in alcohol solvent, all commercially available from Dorf Ketal.

If present, the metal catalyst is preferably present in an amount of 0.1 to 0.5% by weight, preferably 0.2 to 0.3% by weight, based on the weight of the isocyanate component A).

Organic Acid

The two-component composition according to the invention may further comprise one or more organic acids in the isocyanate component A). The organic acid is suitable in order to promote the reaction of the latent amine hardener with water to release the active amine species to cure the isocyanate. The acid can also be supportive to the storage stability of the isocyanate component A).

The at least one organic acid may be selected e.g. from organic carboxylic acids such as benzoic acid, salicylic acid or 2-nitrobenzoic acid, organic carboxylic anhydrides such as phthalic anhydride, hexahydrophthalic anhydride and hexahydromethyl-phthalic anhydride, silyl esters of organic carboxylic acids, organic sulfonic acids such as methane-sulfonic acid, p-toluenesulfonic acid or 4-dodecylbenzene-sulfonic acid, sulfonic esters, other organic or inorganic acids, or mixtures of the aforementioned acids and acid esters. a preferred organic acid is a carboxylic acid, in particular salicylic acid.

If used, the at least one organic acid is preferably present in an amount of 0.005 to 0.05% by weight, preferably 0.010 to 0.025% by weight based on the weight of the isocyanate component A).

Neutral Liquid

As already mentioned before, the two-component composition according to the invention may further comprise neutral liquids, such as plasticizers and/or solvents, in the isocyanate component A) and/or the water component B) so that reference is made thereto.

Antioxidant and Light Stabilizer

The two-component composition according to the invention may optionally comprise at least one antioxidant and/or at least one light stabilizer in the isocyanate component A).

An example of an antioxidant is 2,6-di-tert-butyl-4-nonyphenol, such as Uvinox 1494 (from Rhodia). A blend of bis-(1,2,2,6,6-pentamethyl-4-piperidinyl)-sebacate and 1-(methyl)-8-(1,2,2,6,6-pentamethyl-4-piperidyl)-sebacate, such as Tinuvin 292 (from BASF) is an example for a light stabilizer. A combination of at least, one antioxidant and at least one light stabilizer may be used.

Thus, apart from the essential ingredients (polyurethane polymer, water, latent hardener, preferably aidimine), the inventive two-component composition further comprises in a preferred embodiment:

in isocyanate component A and/or water component B: at least one amine catalyst (preferably in water component B), a thixotropic agent (preferably in water component B), and neutral liquids such as plasticizer and/or solvent;

in water component B: at least one antifreeze agent, at least one surfactant, and at least one filler such as solid filler and/or light weight filler; and in isocyanate component A: at least one monomeric polyisocyanate, at least one silane coupling agent, at least one metal catalyst, and optionally at least one organic acid.

The suitable and preferable compounds and proportions to be used for such ingredients are given above.

The two-component composition of the invention is preferably used as a sealant, i.e. the two-component composition is preferably a sealant.

Method for Sealing a Substrate

The present invention further relates to a method for sealing a substrate or for sealing a joint between two substrates, comprising a) mixing the two components of the two-component composition of the invention, b) applying the mixed two-component composition onto the substrate or in the joint between the substrates, and c) curing of the mixed two-component composition, preferably at a temperature of 4.4° C. or below.

The method is preferably for sealing a joint between substrates.

The substrate may be of concrete, glass, aluminum, brick and/or wood or may have a surface of this material. An example of suitable substrate is concrete plates.

If a joint between two substrates is sealed, the substrates may be the same or different. Preferably, the two substrates are the same.

The substrate or substrates may be e.g. exterior or interior part of a building.

The surface of the substrate where the mixed two-component composition is applied, is preferably a concrete surface, and the substrate is more preferably a concrete substrate.

The sealing enables primerless sealing. Accordingly, it is preferred that the surface substrate on which the mixed two-component composition is applied, is free of a primer.

The mixing ratio by weight of the water component B) to the isocyanate component A) may vary depending e.g. on the nature of the component, a suitable mixing ratio is e.g. 3:1.

The mixing step a), the applying step b) and the curing step c) may be carried out at any suitable temperature, e.g. in the range of −18 to 4.4° C., preferably −10 to 4.4° C. A particular benefit of the invention is that the steps a), b) and/or c), in particular steps b) and/or c), can be carried out at low temperatures such as temperatures of 4.4° C. or below (40° F. or below). Accordingly, the sealing can be also carried out at low outdoor temperatures.

A portion of curing is designed through the reaction between isocyanate with water. Another portion of curing is through the reaction between isocyanate with amine-hardeners, which is released from the reaction between a latent hardener with water. As mentioned, the crosslink density through the latent amine hardener is 25 to 95%, preferably 45 to 75%.

Use of the Two-Component Composition as a Sealant

The present invention further relates to the use of the two component composition according the present invention as a sealant, preferably as a joint sealant, preferably for substrates with a concrete surface. The two-component composition according to the invention enables the primerless sealing of substrates or joints of substrates, in particular for substrates with a concrete surface, even at low temperatures. Thus the two-component composition according to the invention might be preferably used for applications at temperatures of 4.4° C. or below (40° F. or below).

Moreover the present invention relates to a sealant composition comprising the two-component composition according to the present invention.

The following examples are presented to further illustrate and explain the present invention and should not be taken as limiting in any regard.

EXAMPLES

All parts and percentages given below are by weight, unless otherwise indicated.

I) Prepolymer

The urethane prepolymer used in the examples is a prepolymer made of a polyether dial and a polyether triol reacted with toluene diisocyanate. The starting materials used are:

| Parts | Compound |
|---|---|
| 44.00 | A PO (propylene oxide) end capped polyether diol with OH number of 28 and water content of <0.05%, example is Acclaim 4200 from Covestro (polypropyleneetherpolyol) |
| 47.25 | A PO but with 20% EO end capped polyether triol with OH number of 34 and water content of <0.05%, example is Arcol E-448 from Covestro |
| 8.75 | Toluene diisocyanate (TDI), example is Mondur TD-80 from Covestro) |

II) Intermediate Urea Based Thixotropic Agent

| Parts | Compound |
|---|---|
| 9.81 | Pure methylene diphenyl diisocyanate (MDI), example is Mondur M from Bayer |
| 64.18 | Plasticizer Diisodecyl Phthalate (DIDP), example is Jayflex DIDP |
| 5.18 | N-butylamine |
| 0.13 | N-methyl-2-pyrrolidone |

III) Latent Amine Hardener; Dialdimine Latent Hardener

Structure of 2 functional latent hardener (Sika®hardener LI), is the reaction product between one molecule of isophorone diamine with two molecules of aldehyde L, which is an aldehyde of formula (Vb)

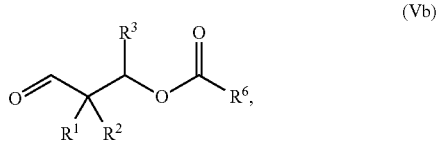

(Vb)

wherein $R^1$ and $R^2$ are both methyl, $R^3$ is hydrogen and $R^6$ is $C_{11}H_{23}$.

IV) Latent Amine Hardener; Trialdimine Latent Hardener

Structure of 3 functional latent hardener (Sika®hardener LTJ), is the reaction product between one molecule of polyetheramine of a repeated oxypropylene structure, example is Jeffamine®T403 from Huntsman, with three molecules of Aldehyde L, as defined in III).

V) Antioxidant and HAL Light Stabilizator Combination

Intermediate of 40% of antioxidant 2,6-di-tert-butyl-4-nonyphenol, example is Uvinox 1494 from Rhodia, and 60% of a blend of bis-(1,2,2,6,6-pentamethyl-4-piperidinyl)-sebacate and 1-(methyl)-8-(1,2,2,6,6-pentamethyl-4-piperidyl)-sebacate, an example of this product is offered by BASF under the brand name Tinuvin®292.

Three different two-component compositions according to the present invention were prepared with the following components:

| Formulation A1 |
|---|
| Parts compound |
| 71.66 Urethane prepolymer resin as described in I) |
| 2.00 Isophorone diisocyanate, example is Desmodur I from Covestro |
| 7.29 Dialdimine latent Hardener LI as described in III) |
| 0.90 Antioxidant and light stabilizer combination as described in V) |
| 3.64 Plasticizer diisodecyl phthalate (DIDP), example is Jayflex DIDP from ExxonMobil |
| 12.97 Xylene as solvent |
| 0.35 A solution of 5% salicylic acid in dioctyl adipate (DOA), plasticizer |
| 0.40 Catalyst dimorpholine diethyl ether, example is Jeffcat DMDLS from Huntsman |
| 0.20 Titanium catalyst of composition of triethanolamine titanium complex blended with isopropyl alcohol for activating silane coupling agent, example is "Tyzor TE Titanate" from DuPont |
| 0.60 Bis(trimethoxysilylpropyl)amine, the silane coupling agent as adhesion promoter, example is Silquest A-1170 from Momentive |

| Formulation B1 |
|---|
| Parts compound |
| 18.00 Plasticizer diisodecyl phthalate (DIDP), example is Jayflex DIDP from ExxonMobil |
| 35.00 Intermediate urea based thixotrop as described in II) |
| 33.00 Grounded Calcium Carbonate, example is Marble white Q325 from Specialty Minerals |
| 5.20 Precipitated Calcium carbonate, example is Ultra-flex from Specialty Minerals |
| 5.00 Polyvinylchloride powder, example is Solvin 373MC from Solvay |
| 1.50 Titanium dioxide, a pigment from Kronos |
| 0.30 Iron oxide black pigment |
| 0.05 Iron oxide yellow pigment |
| 0.80 Light weight filler, example is Expancel 551DE40d42 from Akzo |
| 0.05 Surfactant, example is Rhodacal DS-10 from Rhodia |
| 0.20 Propylene glycol |
| 1.10 Water |

| Formulation A2 |
|---|
| Parts compound |
| 76.00 Urethane prepolymer resin as described in I) |
| 2.10 Isophorone diisocyanate, example is Desmodur I from Covestro |
| 9.50 Dialdimine latent Hardener Li as described in III) |
| 0.90 Antioxidant and light stabilizer combination as described in V) |
| 10.00 solvent xylene |
| 0.30 A solution of 5% salicylic acid in dioctyl adipate (DOA) plasticizer |
| 0.40 Catalyst dimorpholine diethyl ether, example is Jeffcat DMDLS from Huntsman |
| 0.20 A titanium catalyst of composition of triethanolamine titanium complex blended with isopropyl alcohol for activating silane coupling agent, example is "Tyzor TE Titanate" from DuPont |
| 0.60 (3-Mercaptopropyl) trimethoxysilane, the silane coupling agent as adhesion promoter, example is Silquest A-189 from Momentive |

| Formulation B2 | |
|---|---|
| Parts | compound |
| 18.00 | Plasticizer diisodecyl phthalate (DIDP), example is Jayflex DIDP from ExxonMobil |
| 30.60 | Intermediate urea based thixotrop as described in II) |
| 37.00 | Grounded Calcium Carbonate, example is Marble white Q325 from Specialty Minerals |
| 5.20 | Precipitated Calcium carbonate, example is Ultra-flex from Specialty Minerals |
| 5.00 | Polyvinylchloride powder, example is Solvin 373MC from Solvay |
| 1.50 | Titanium dioxide, a pigment from Kronos |
| 0.30 | Iron oxide black pigment |
| 0.05 | Iron oxide yellow pigment |
| 0.80 | Light weight filler, example is Expancel 551DE40d42 from Akzo |
| 0.05 | Surfactant, example is Rhodacal DS-10 from Rhodia |
| 0.20 | Propylene glycol |
| 1.30 | Water |

| Formulation A3 | |
|---|---|
| Parts | compound |
| 79.00 | Polyurethane prepolymer resin as described in I) |
| 2.00 | Isophorone diisocyanate, example is Desmodur I from Covestro |
| 8.10 | Dialdimine latent Hardener LI as described in III) |
| 0.90 | Antioxidant and light stabilizer combination as described in V) |
| 9.00 | Solvent xylene |
| 0.35 | A solution of 5% Salicylic acid in dioctyl adipate (DOA) plasticizer |
| 0.20 | Catalyst dimorpholine diethyl ether, example is Jeffcat DMDLS from Huntsman |
| 0.20 | Titanium catalyst of composition of triethanolamine titanium complex blended with isopropyl alcohol for activating silane coupling agent, example is "Tyzor TE Titanate" from DuPont |
| 0.60 | Bis(trimethoxysilylpropyl)amine, the silane coupling agent as adhesion promoter, example is Silquest A-1170 from Momentive |

| Formulation B3 | |
|---|---|
| Parts | compound |
| 15.00 | Plasticizer Diisodecyl Phthalate (DIDP), example is Jayflex DIDP from ExxonMobil |
| 30.60 | Intermediate urea based thixotrop as described in II) |
| 37.00 | Grounded Calcium Carbonate, example is Marble white Q325 from Specialty Minerals |
| 13.20 | Precipitated Calcium carbonate, example is ThixoCarb-500 from Specialty Minerals |
| 1.50 | Titanium dioxide, a pigment from Kronos |
| 0.30 | Iron oxide black pigment |
| 0.05 | Iron oxide yellow pigment |
| 0.80 | Light weight filler, example is Expancel 551DE40d42 from Akzo |
| 0.05 | Surfactant, example is Rhodacal DS-10 from Rhodia |
| 0.20 | Propylene glycol |
| 1.30 | Water |

VI) Sealants

Sealants according to the present invention were prepared by mixing the two-components of the two-component composition as follows:

Sealant OT17:

Formulations A1 and B1 were mixed in a ratio A1:B1 of 1:3

Sealant OT23:

Formulations A2 and B2 were mixed in a ratio A2:B2 of 1:3

Sealant OT40:

Formulations A3 and B3 were mixed in a ratio A3:B3 of 1:3

The inventive sealants are tested as follows:

Pot-life is measured by Brookfield Viscometer with HB Spindle #7 at 50 rpm until the viscosity is so high that no more reading can be recorded.

Dog-bone tensile strength, elongation and E-modulus is measured according to ASTM D412 at a speed of 50.8 cm/min (20 inches/min). The sample was cured at 23° C. and 50% r.h. for 7 days.

H-piece tensile strength and elongation is measured according to ASTM C1135 at a speed of 5.08 cm/min (2 inches/min). The sample was cured at 23° C. and 50% r.h. for 7 days.

Tear strength is measured according to ASTM D6241 with a crosshead speed of 50.8 cm/min (20 inches/min). The sample was cured at 23° C. and 50% r.h. for 7 days.

Shore A hardness is measured with a ASTM 02240 durometer. The sample was cured at 23° C. and 50% r.h. for 7 days.

The extrusion force of the water part is measured according to Sika procedure SQP234 with 3 mm orifice.

Viscosity of isocyanate part is measure with Brookfield Viscometer with HB Spindle #5 at 100 rpm.

A commercial product, Sikaflex-2C NS EZ Mix (urethane-based), is tested in the same way as a comparative example. The commercial reference product is a standard 2 component polyurethane sealant with an isocyanate-functional polyurethane polymer in the hardener component (B) and polyols in the base component (A). It has no added water or latent hardener.

VII) Performance Testing and Comparison to a Product of the Prior Art

| | 2C NS EZ-Mix Comparative Example | OT17 | OT23 | OT40 |
|---|---|---|---|---|
| 1st observation when mixed at −12° C. | Hardly mixable | Easy to mix and strong body | Easy to mix and strong body | Easy to mix and strong body |
| Pot life at 23° C. | ~3 h | n/a | ~1.2 h | 1.5 h |
| Pot life at −12° C. | n/a | >3 h | >3 h | >3 h |
| Dog-bone ultimate tensile strength [MPa] | ~0.8 | 0.7 | 0.7 | 0.9 |
| Dog-bone elongation at break [%] | 530 | 777 | 830 | 1000 |
| Dog-bone 0.5-5% modulus | ~1.7 | 0.5 | 0.8 | 0.8 |

-continued

|  | 2C NS EZ-Mix Comparative Example | OT17 | OT23 | OT40 |
|---|---|---|---|---|
| Dog-bone 0.5-25% modulus [MPa] | ~1.0 | 0.4 | 0.5 | 0.5 |
| Dog-bone 0.5-50% modulus [MPa] | 0.8 | 0.4 | 0.3 | 0.4 |
| Dog-bone 0.5-100% modulus [MPa] | ~0.5 | 0.3 | 0.2 | 0.3 |
| Tear strength [>lbn/in] | 43.3 | 35.0 | 36.0 | 35.0 |
| Tear strain [%] | ~400 | 713 | 850 | 579 |
| Shore A hardness, 7 d/23° C., 50% RH | 35 | 19 | 25 | 20 |
| H-Piece Ultimate strength [MPA], w/o primer | ~0.7 | n/a | 0.5 | 0.6 |
| H-Piece-Elongation at Max. Load [%], w/o primer | ~200 | n/a | 335 | 509 |
| H-piece Elongation at break [%], w/o primer | ~250 | n/a | 350 | 545 |
| CASTM C719/C920 Movement | Class 25 passed |  |  | Class 25 passed |
| Extrusion Force of Part B 3 mm orifice [N] | ~1400 at 4° C. 2430 at −12° C. | n/a | 923.0 at −12° C. | 1192.0 at −12° C. |
| Viscosity of part A as measured with Brookfield Rheomat HB spindle #5 and at 100 rpm[cps] | ~50'000 at 4° C. No reading at −12° C. | n/a | 40'000 at −12° C. | 61'500 at −12° C. |
| 3 days at −12° C. | Not cured through | Cured through and TFT | Cured through and TFT | Cured through and TFT |
| 7 days at −12° C. | Not cured through | Tacky free adhesion develops | Tacky free adhesion develops | Good adhesion |
| 1 day at 23° C. | Adhesion is developing | TFT and good adhesion | TFT and good adhesion | TFT and good adhesion |
| 2 days at 23° C. | Good adhesion | Good adhesion | Good adhesion | Good adhesion | n/a = not applicable
TFT = tack-free time

The invention claimed is:

1. A two-component composition comprising
   A) an isocyanate component comprising an isocyanate-terminated urethane prepolymer,
   B) a water component comprising water and at least one antifreeze agent, wherein the at least one antifreeze agent is present in an amount of 0.1 to 0.5 parts by weight to 1 part by weight of the water in the water component B,
and at least one latent amine hardener in component A).

2. The two-component composition according to claim 1, wherein the isocyanate-terminated urethane prepolymer has a free isocyanate content of 1.0 to 3.5%.

3. The two-component composition according to claim 1, wherein the isocyanate-terminated urethane prepolymer is obtainable by reacting at least one polyisocyanate with at least two polyether polyols.

4. The two-component composition according to claim 3, wherein the at least one polyisocyanate comprises toluene diisocyanate.

5. The two-component composition according to claim 1, wherein the amount of the at least one antifreeze agent in the water component B is 0.15 to 0.25 parts by weight to 1 part by weight of the water.

6. The two-component composition according to claim 1, wherein the at least one latent amine hardener is an aldimine compound.

7. The two-component composition according to claim 1, wherein the molar ratio of water to free isocyanate groups in the isocyanate terminated urethane prepolymer is from 2:1 to 10:1.

8. The two-component composition according to claim 1, wherein the two-component composition comprises 17 to 25% by weight of the isocyanate-terminated urethane prepolymer, based on the total weight of the components A) and B).

9. The two-component composition according to claim 1, wherein the two-component composition further comprises an amine catalyst in the isocyanate component A) and/or in the water component B).

10. The two-component composition according to claim 1, wherein the isocyanate component A) further comprises one or more monomeric polyisocyanates, and/or at least one silane coupling agent.

11. The two-component composition according to claim 1, wherein the at least one antifreeze agent comprises a glycol.

12. The two-component composition according to claim 1, wherein the at least one antifreeze agent is one or more member selected from the group consisting of ethylene glycol, diethylene glycol, propylene glycol, dipropylene glycol, and glycerol.

13. The two-component composition according to claim 1, wherein the at least one antifreeze agent is one or more member selected from the group consisting of propylene glycol and diethylene glycol.

14. A method for sealing a substrate or for sealing a joint between two substrates, comprising
   a) mixing the two components of the two-component composition according to claim 1,
   b) applying the mixed two-component composition onto the substrate or in the joint between the substrates, wherein the surface of the substrate where the mixed two-component composition is applied, and c) curing of the mixed two-component composition at a temperature of 4.4° C. or below.

15. A method comprising applying the two component composition according to claim 1 as a sealant, and after the two component composition has mixed, curing the mixed two-component composition at a temperature of 4.4° C. or below.

16. A sealant composition comprising the two-component composition according to claim 1.

* * * * *